Sept. 22, 1931.                  C. SMITH                    1,824,693
                AUTOMATIC EGG WEIGHING AND SORTING MACHINE
                   Filed Feb. 21, 1928      8 Sheets-Sheet 1

Sept. 22, 1931.    C. SMITH    1,824,693
AUTOMATIC EGG WEIGHING AND SORTING MACHINE
Filed Feb. 21, 1928    8 Sheets-Sheet 2

Inventor
Clement Smith
James J. Sheehy
Attorneys

Sept. 22, 1931.  C. SMITH  1,824,693
AUTOMATIC EGG WEIGHING AND SORTING MACHINE
Filed Feb. 21, 1928  8 Sheets-Sheet 3

Inventor
Clement Smith
James J. Sheehy
Attorneys

Sept. 22, 1931. C. SMITH 1,824,693
AUTOMATIC EGG WEIGHING AND SORTING MACHINE
Filed Feb. 21, 1928 8 Sheets-Sheet 4
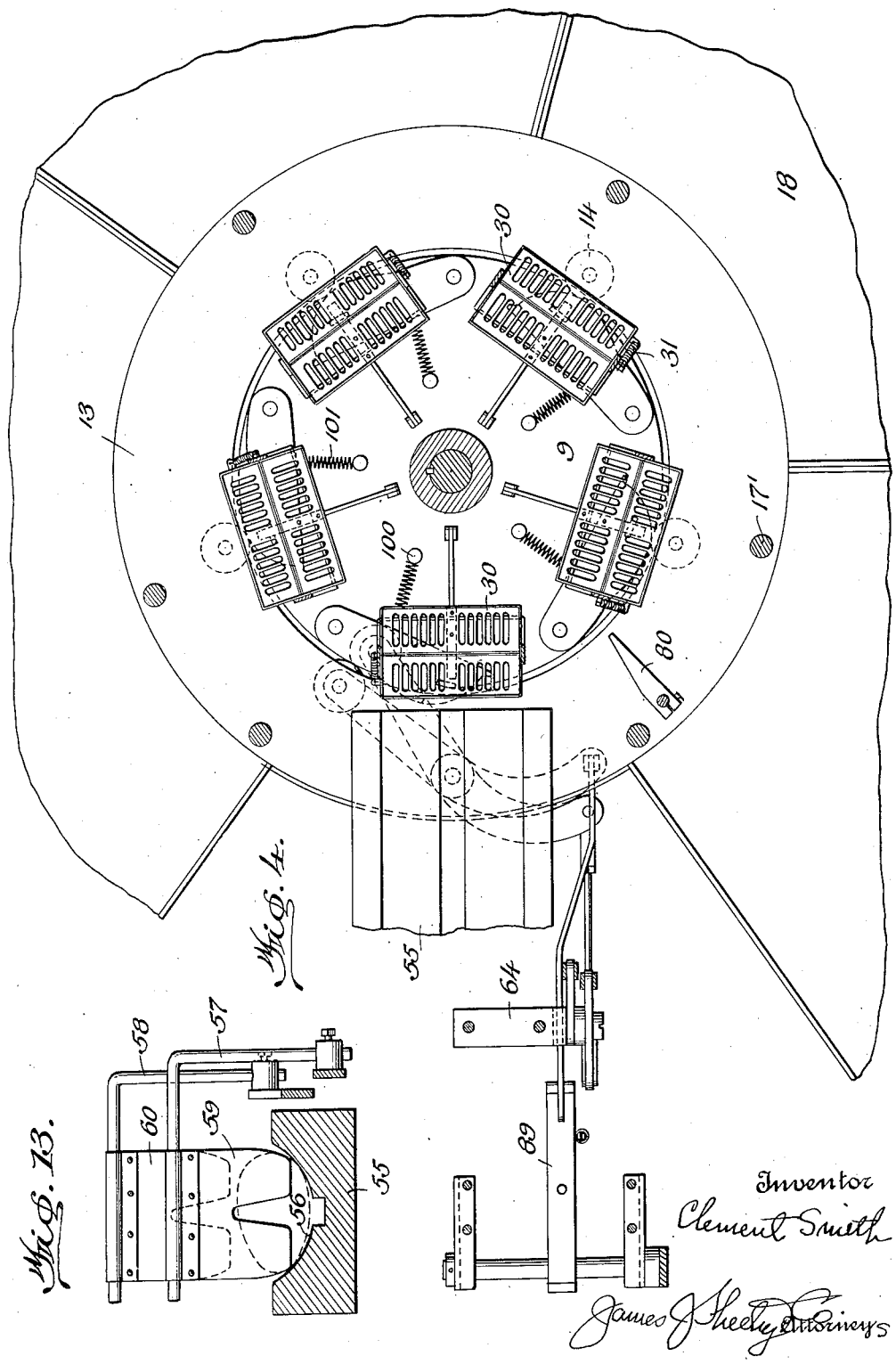

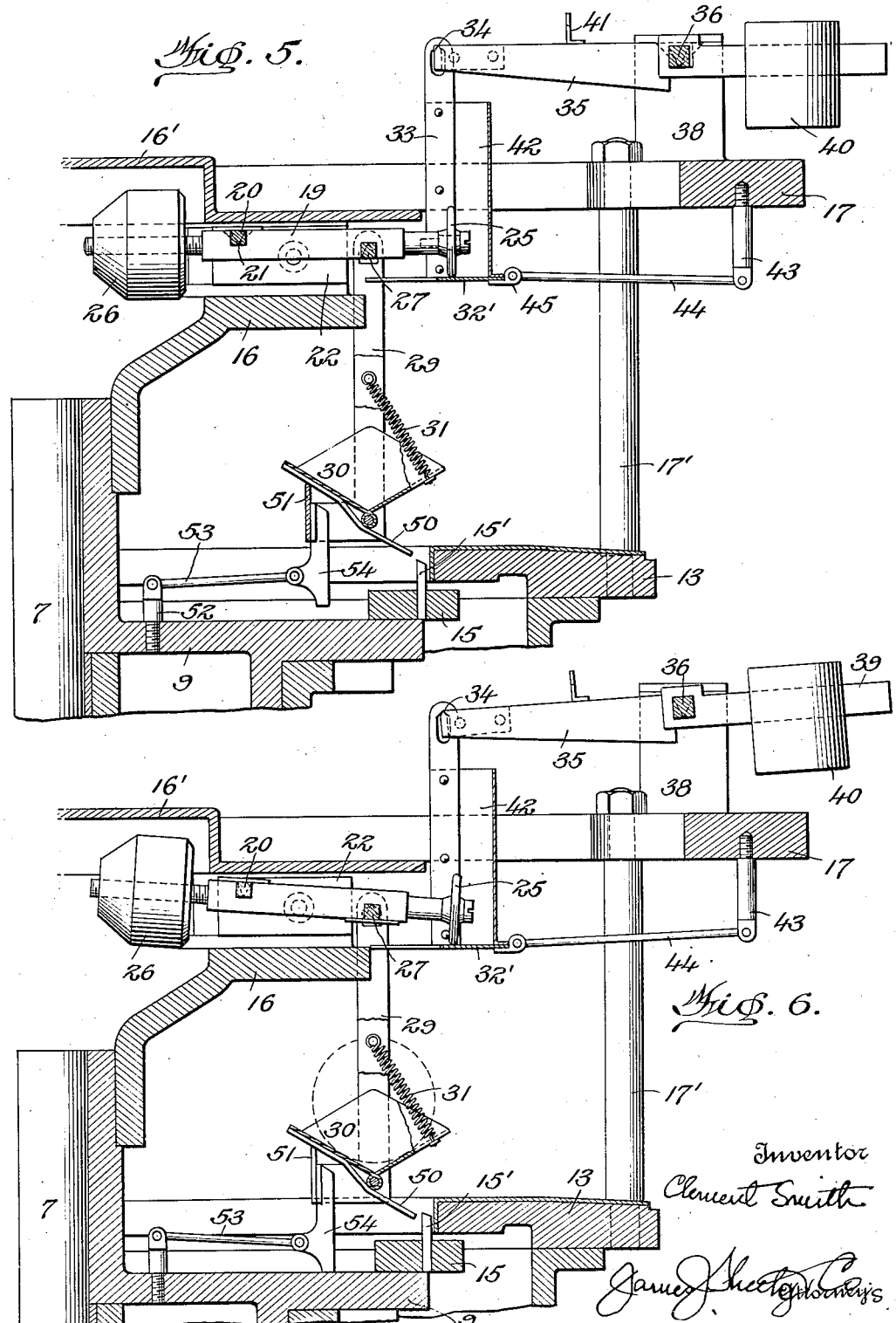

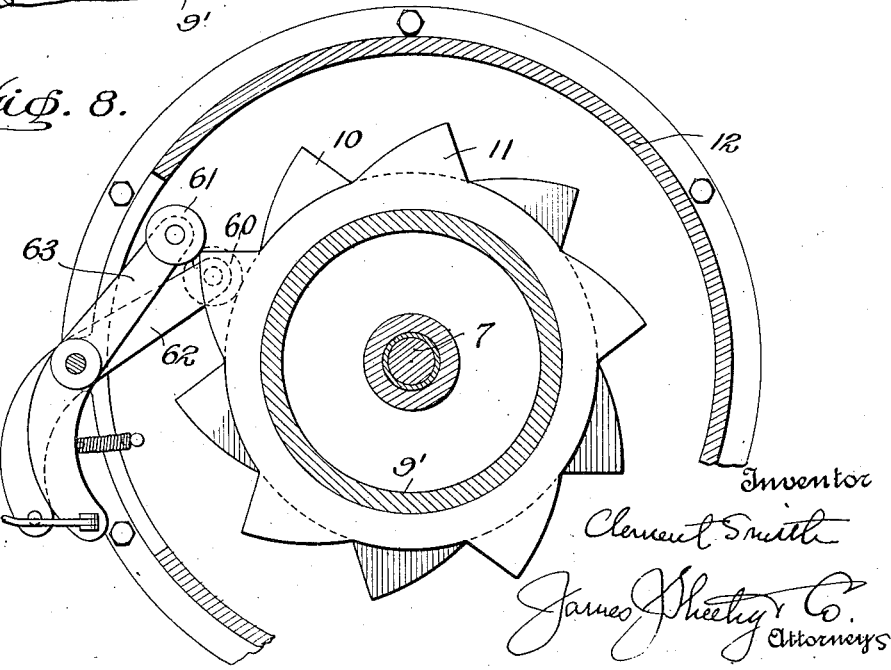

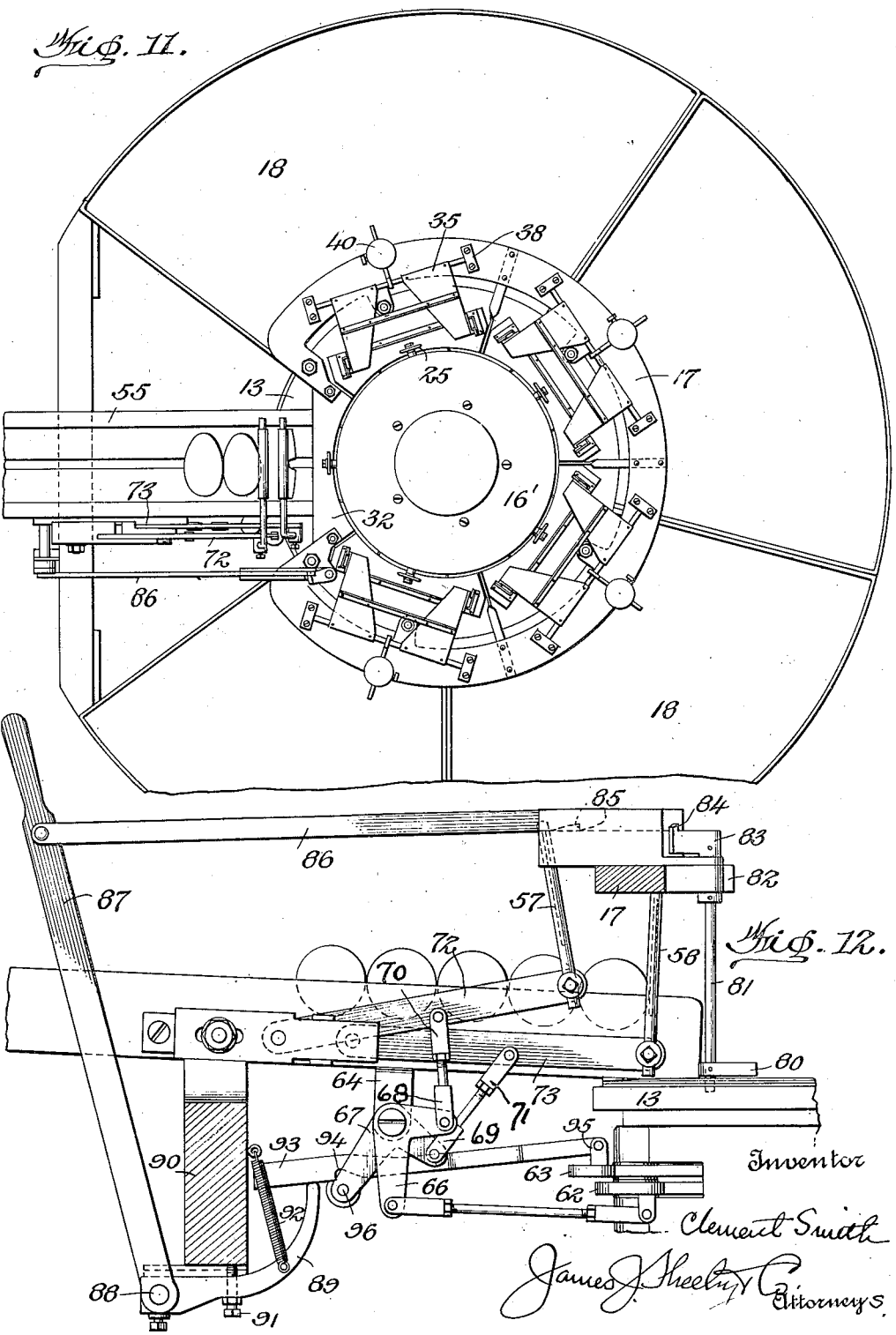

Sept. 22, 1931.　　　　C. SMITH　　　　1,824,693
AUTOMATIC EGG WEIGHING AND SORTING MACHINE
Filed Feb. 21, 1928　　　8 Sheets-Sheet 8
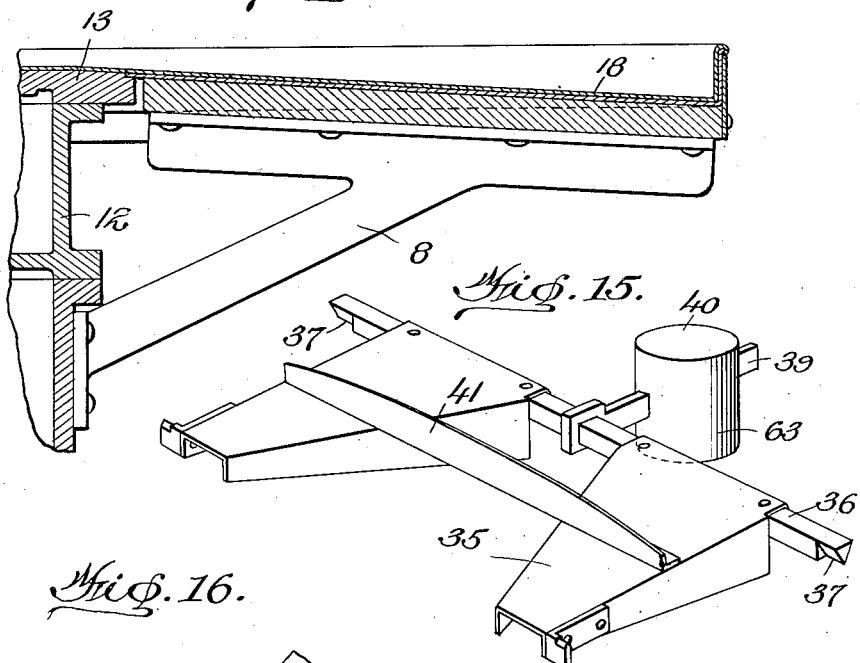
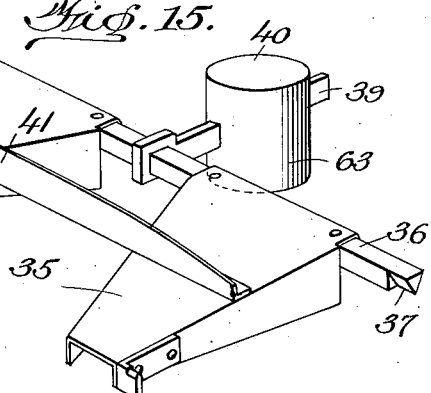
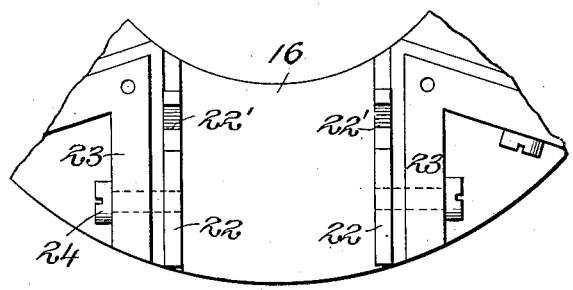
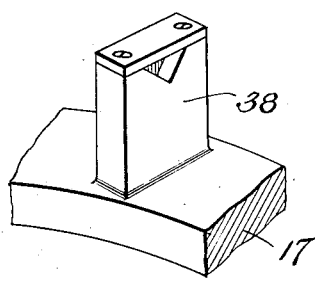
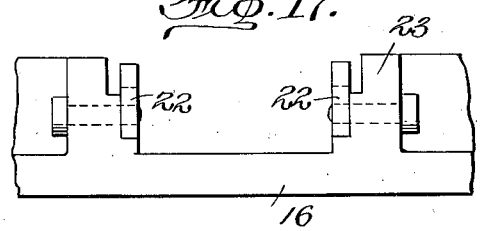
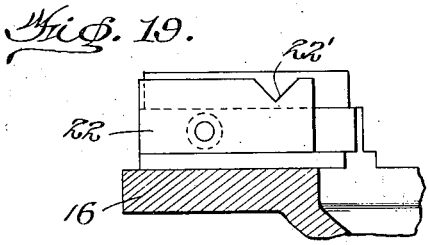
Inventor
Clement Smith
James J. Sheehy Co.
Attorneys Patented Sept. 22, 1931

1,824,693

UNITED STATES PATENT OFFICE

CLEMENT SMITH, OF TOPEKA, KANSAS

AUTOMATIC EGG WEIGHING AND SORTING MACHINE

Application filed February 21, 1928. Serial No. 256,039.

My present invention pertains to egg assorting machines and it contemplates the provision of a device through the medium of which eggs may be readily and expeditiously assorted or graded according to weight.

The invention further contemplates the provision of an egg weighing and assorting device that is so constructed and arranged that the operation of the device and sorting of the eggs will be accomplished without liability of breaking or other-wise damaging the eggs during the sorting operation.

Other objects of the invention will be fully understood from the following description and claims when the same are read in connection with the drawings accompanying and forming part of this specification in which:

Figure 4 is a top plan view showing the arrangements of the egg baskets and the cam actuating means for operating the baskets as well as the mechanism for preventing feed of the eggs into the machine, when the necessity arises.

Figure 5 is a view illustrating my novel balance mechanism, scale weighing mechanism and egg basket construction in normal position, with the basket unoccupied.

Figure 6 is a view similar to Figure 5 with one of the baskets containing an egg and showing the relative arrangement of parts of the balance mechanism and scale under such conditions.

Figure 7 is a view illustrating the arrangement and position of the various elements shown in Figures 5 and 6 at the time an egg is ejected from the basket.

Figure 8 is a top plan view showing the cam mechanism and bearings for actuating the step by step feed mechanism of the device.

Figure 9 is a detail view of my novel balance mechanism per se.

Figure 10 is a detail view of the mechanism for actuating the egg discharge mechanism of the device when occasion requires.

Figure 11 is a top plan view of my novel device and showing the cover plate mounted thereon.

Figure 12 is a view partly in section and partly in side elevation showing the step by step feeding mechanism of the machine and the safety stop mechanism adapted to cooperate with the feed mechanism under various conditions.

Figure 13 is a view taken at the inner end of the feed trough of the machine and illustrating the trough in sections and the baffle plates of the feed mechanism in elevation.

Figure 14 is a view partly in section and partly in side elevation and illustrating the manner in which the egg receiving bins or plates are secured to the casing of the machine.

Figure 15 is a perspective view of the egg weighing mechanism.

Figure 16 illustrates the frame adapted to engage the balance mechanism of the device.

Figure 17 is a similar view taken in front elevation.

Figure 18 illustrates in detail the standard of the egg weighing scale mechanism.

Figure 19 is a view showing the detail construction of the support for the balance mechanism.

Similar numerals of reference designate corresponding parts in all the views of the drawings.

Figure 1:
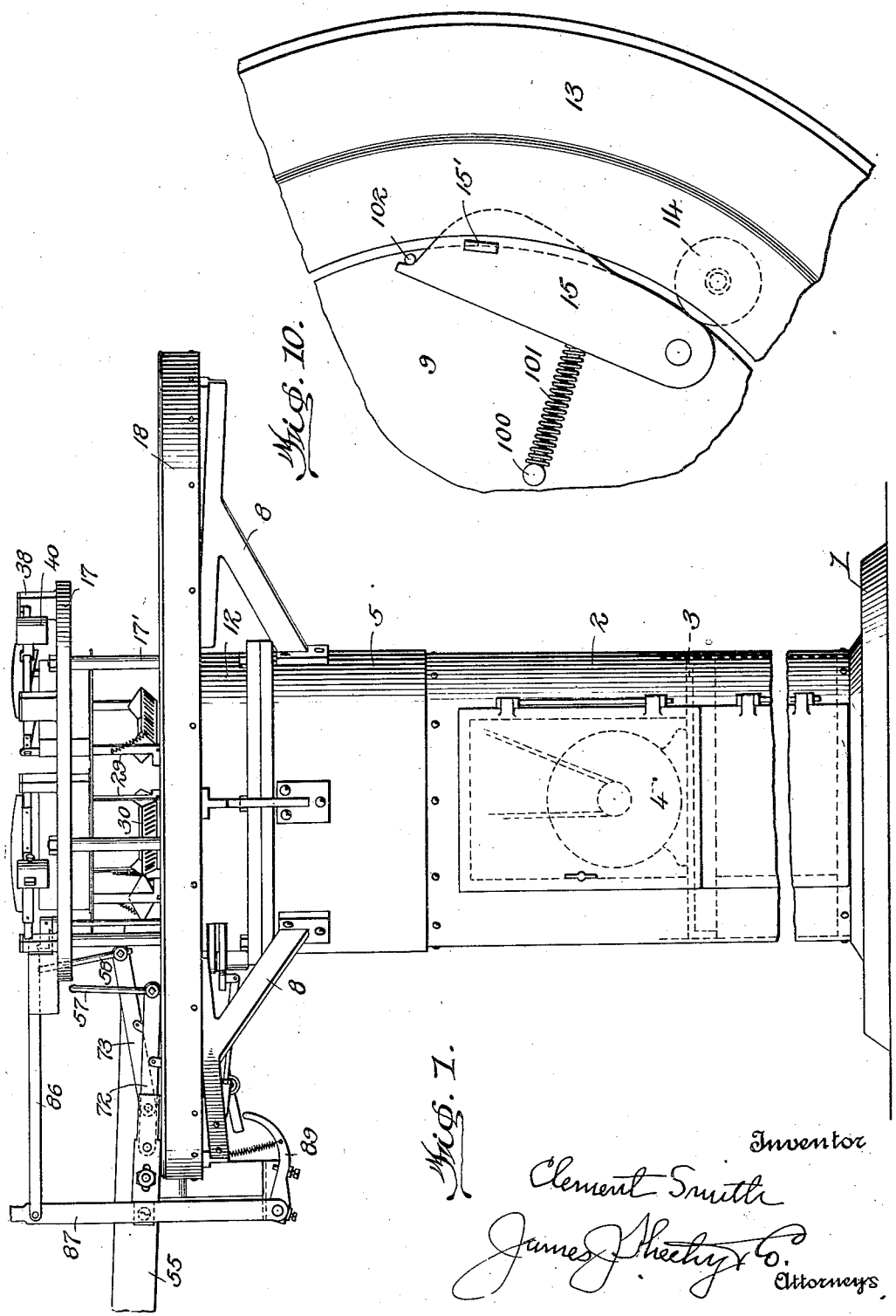
Figure 1 is a front elevation illustrating my novel device.

My novel device comprises a base 1 having mounted thereon in any suitable manner a steel shell or column 2. Arranged within the casing 2 is a shelf 3 on which is mounted a motor 4. Superimposed and riveted or otherwise secured on the column 2 is a casting 5 having an integral shelf 5' on which I mount a speed reducing mechanism 6. Rotatable through the motor and secured to the speed reducing mechanism 6 is a shaft 7.

By reference to Figures 1 and 14 it will be noted that on the exterior of the casting 5 I mount a series of braces or brackets 8 for a purpose hereinafter set forth.

Figure 2:
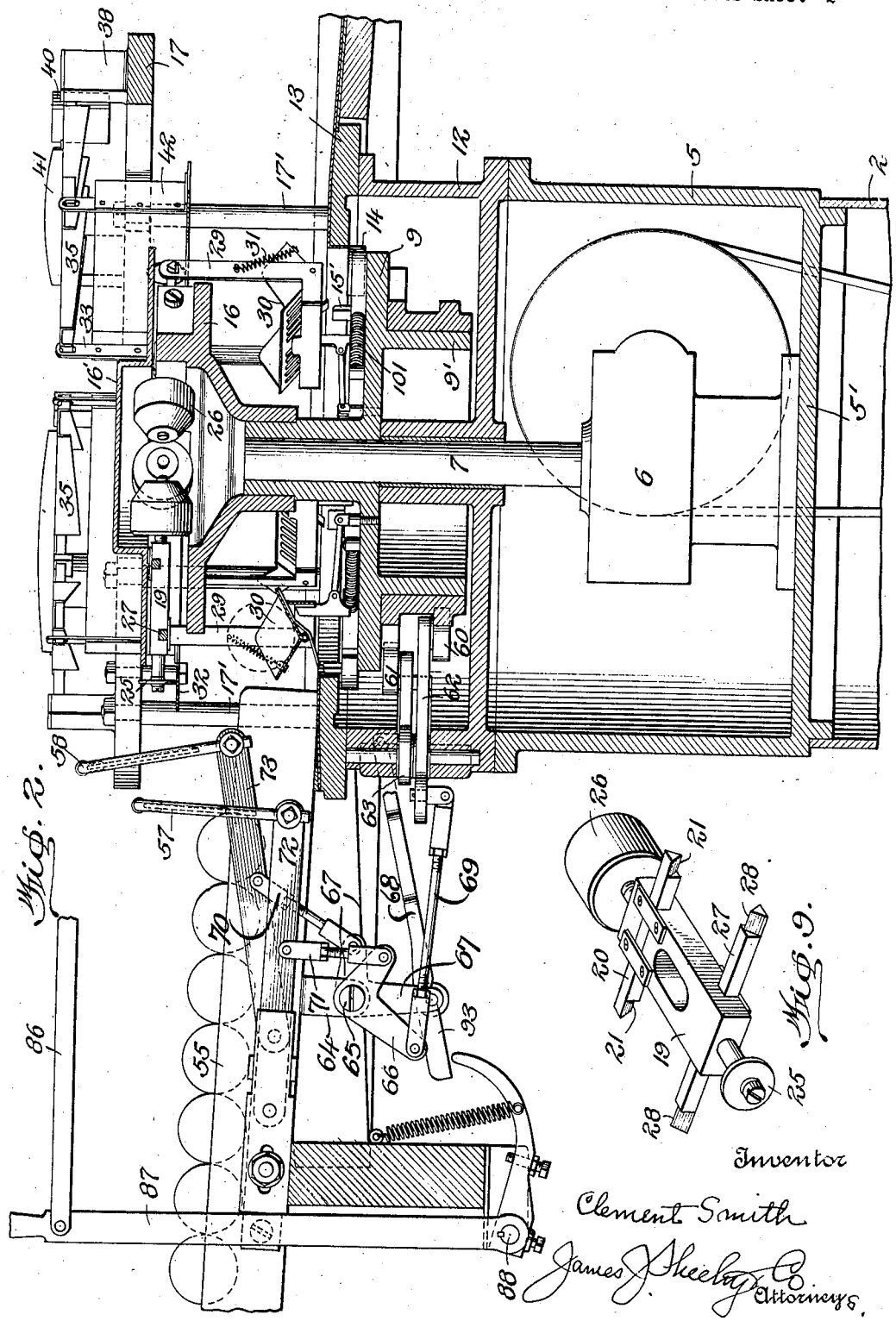
Figure 2 is a longitudinal sectional view showing the construction and relative arrangement of the machine as assembled.

Referring to Figure 2 it will be noted that I arrange on the shaft 7 a carrier and cam plate 9. To the under side of the plate 9 I provide a feed operating cam 10, Figure 8 and a holding or stop operating cam 11 and by reference to Figure 2 it will be seen that the plate 9 as well as the cams 10 and 11 are surrounded by an outer casing 12 that rests on and is preferably secured to the casting 5.

Mounted above and resting on the casting 12 is an egg delivery ring or plate 13. It will be noted that the carrier and cam plate 9 carries on its upper face five more or less tripping cams 15 (one of which is clearly illustrated in Figure 10) and the delivery ring or plate 13 carries a like number of rollers 14 and consequently in view of the fact that the carrier plate 9 is being constantly rotated by the shaft 7 the cams will be actuated by the rollers 14 during rotation of the plate 9 with the shaft. Manifestly the plate 9 is provided with these tripping cams 15 on its upper face and on its lower face is provided with the apron like drum 9' to which the cams 10 and 11 operating the feeding mechanism are secured.

Each of the cams 15 have formed therein a finger or trip 15' and as clearly shown in Figure 10 a stud 100 engages a coil spring 101 that in turn is secured to the cam 15; the purpose of said spring being to return the cam to its normal inoperative position. I furthermore provide on the plate a stud 102 for limiting movement of the cam 15 away from the spring.

By particular reference to Figure 2 it will be noted that I provide the plate 9 with an integral hub portion and secured on the hub portion is a carrier head 16 and the said head 16 supports a cap 16'.

Extending upwardly and riveted or otherwise secured in the ring or plate 13 are a series of studs 17' that are adapted to support a scale carrier casting 17 and secured as before stated by means of the brackets 8 to the casting 5 is a plate 18 that is divided into a series of bins. The plate 18 like the ring or plate 13 as well as the scale casting 17 are stationary at all times. These divisions of the plate 18 are in reality compartments or bins to accommodate various sizes of eggs after the sorting operation has been accomplished.

My novel equalizing device and egg basket carrier construction clearly illustrated in its various operations and relative positions in Figures 5, 6 and 7 comprises a body portion 19 having at its balanced center, a rod 20. This rod 20 has a knife edge 21 that bears on the members 22 clearly shown in Figure 5. These members 22 are secured on a frame 23 and passing through the frame 23 and the members 22 are studs or screws 24. These members as well as the frame construction shown in detail in Figures 16, 17 and 19 are adapted to engage the rod 20 so that the knife edge 21 thereof bears in the groove or channel 22' Figure 19 of the members 22 to normally balance the equalizer. Manifestly it will be seen that this form of fulcrum balance is of the conventional scale pivot type.

Figure 3:
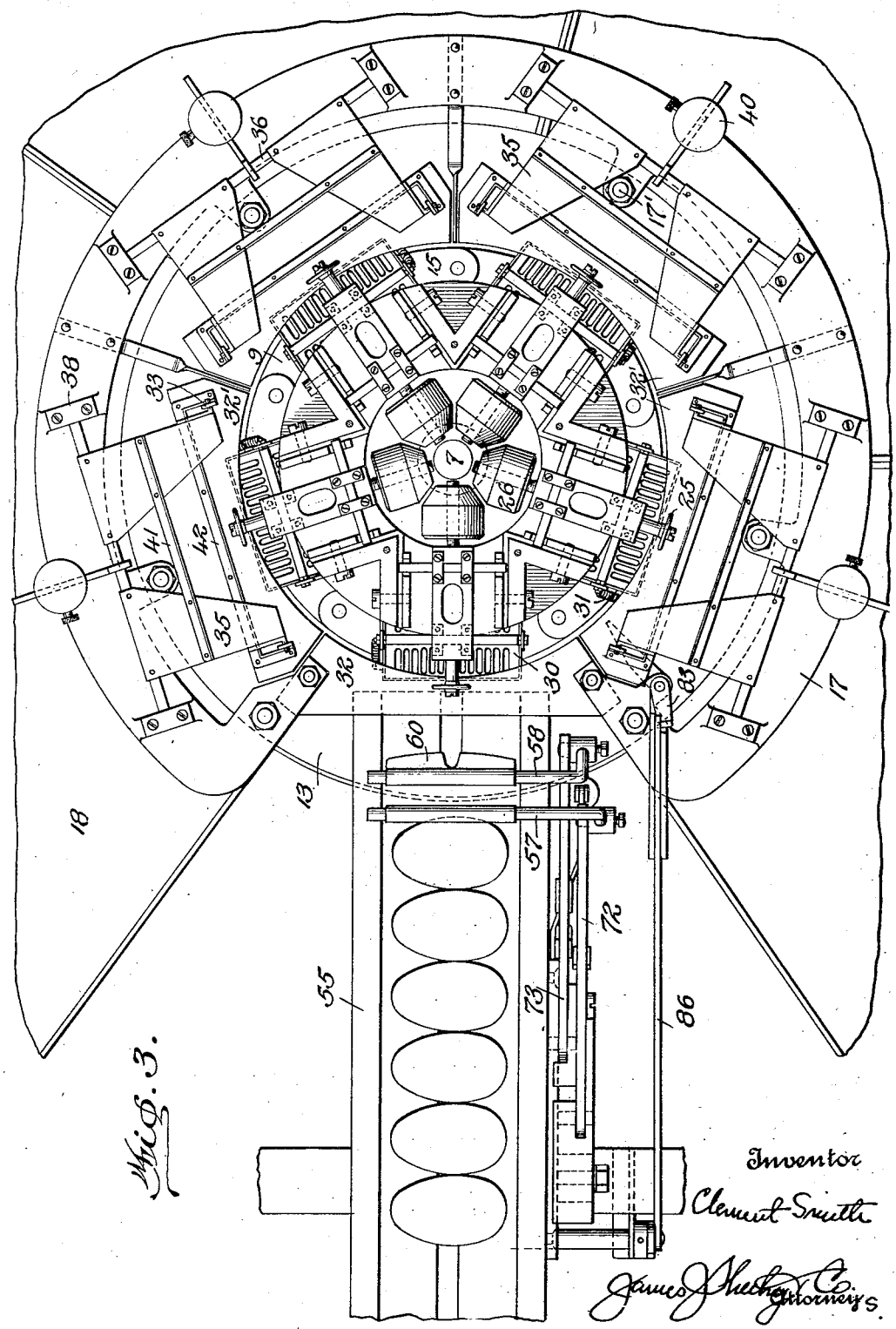
Figure 3 is a top plan view illustrating the machine with the top plate removed therefrom.

The body member 19 of the equalizing device is provided on one end with a wheel 25 and on the opposite end with a balance weight 26, while adjacent the end of the body portion 19 in proximity to the wheel 25 is a cross rod 27 Figures 5 and 9 respectively. This cross rod 27 parallels the fulcrum rod and has its ends so constructed and arranged that they form upward pointing knife edges 28. The said knife edged pivots 28 are adapted to carry thereon a depending frame 29 of the egg carrying baskets 30. The baskets 30 are tiltable and held in normal position by means of springs 31, and as clearly shown in Figure 3 I provide the series of egg bins 18 beginning at one side of the mouth of the trough, and, between the first and last section of the plate 18 I arrange a stationary platform 32 over which the wheel of the equalizing device travels before it moves to the first of a series of depressible platforms hereinafter specifically referred to. The stationary platform may be provided with a track on the upper face thereof when deemed expedient, the purpose of which is to assure the equalizing device moving in line over the platform.

Mounted in a series and grouped about the machine, in such a manner so that one of the series is adjacent and in communication with each division bin or compartment of the plate 18, are scale platforms 32', and extending upwardly from the platforms 32' are supports 33 that are pivotally secured at 34 to an arm 35. This arm in turn engages a rod 36 having the knife edge 37 and the arm 36 in turn is engaged by the scale upright or standard 38 mounted on the scale carrier casting 17. The usual weight arm 39 and adjustable weight 40 are used. The members 33 and 35 of each series of scales are riveted or otherwise secured together by means of the angle members 41 and 42. Adapted to engage a depending short arm 43 and pivotally mounted therein is a radius rod 44 that is secured at its forward end to the platform 32 by means of a connection 45. It will be apparent that the wheel 25 travels horizontally around the machine and will initially contact the stationary platform 32, thus holding its corresponding basket against vertical movement. While in this position an egg is fed into the basket. After passing over the stationary track rotary operation of the shaft 7 causes the wheel 25 of the equalizer to move and thus engage the platform 32' of the first of the series of such platforms. If the weight of the egg is sufficient to throw the equalizer member off balance and of sufficient weight to pull the wheel 25 downwardly, to exert pressure on the scale platform 32' and overcome the weight 40 of the scale of the particular platform in question, the basket of necessity in conjunction with the frame 29 thereof caused by the movement of the body member 19 of the equalizer will be moved. If there is sufficient depression due to the weight of the egg the finger 50 will be engaged by the trip 15' and the basket will be moved or tilted to the position shown in Figure 7. In order to limit the movement of the basket and allow it to tilt in only one direction and at the same time act as an abutment for the frame 29 a stop 51. This stop assures the basket of being in proper position at all times and causes the egg, regardless of weight or size, to rest in bottom of the basket. Otherwise an egg may drop into the basket and assume such a position that its weight alone under all conditions would not be the determining factor in actuating the equalizing device and tripping mechanism. Extending from the carrier and cam plate 9 is a stud 52 that carries a radius rod 53 and this rod in turn is connected with the member 54 that reaches upwardly and engages the stock of the frame 29 so as to hold the frame in normal pendent position.

By reference to Figures 2 and 13 it will be noted that I provide a feeding trough 55 having the peculiarly shaped groove 56 and said groove is of the construction illustrated because it has been clearly demonstrated that due to the ovoid shape of eggs they are prone to travel down an incline at various angles, this is overcome by the construction of the trough illustrated. Mounted on arms 57 and 58 are baffle plates 59 and 60, Figure 13, and the said baffle plates are comprised of aluminum or other suitable material having a leather or soft covering to eliminate the breakage of eggs. It will be seen that the baffles are spaced approximately the width of an average egg with respect to each other and that the baffles are actuable upwardly and downwardly so that the eggs are fed into the machine under a step by step operation. While an egg is being permitted to move out of the space between the two baffles the egg following is prevented from entering said space. Of course the incline of the trough is so arranged that the eggs will not roll too fast and hence crack the shells. The baffle 59 is what might be termed the feeding baffle and the baffle 60' may be termed the checking baffle. The said baffles are actuated by the cams 10 and 11 attached to the apron-like drum of the plate 9. When the cams 10 and 11 rotate with the plate 9 they alternately actuate the rollers 60 and 61 Figure 8 mounted on the levers 62 and 63 that in turn are connected through the dependent member 64 by means of the stud 65 that holds bell crank levers 66 and 67 that in turn engage members 68 and 69 that are also secured to members 70 and 71 that are pivoted to the arms 72 and 73. These arms in turn engage the rods 57 and 58 that hold the baffles 59 and 60'. The levers manifestly are adjustable endwise by means of the buckles and it will be apparent that upon rotation of the cams 10 and 11 one of the members 62 or 63 will be alternately lifted and dropped so as to alternately lift the baffles. Although the lifting of the baffles is accomplished by means of the cams and the rollers 60 and 61 contacting therewith, nevertheless the dropping of the baffles is accomplished by gravity and hence a non-positive action is present, that is, not fraught with the liability of breaking the eggs during the feeding operation as would be the case were the dropping operation of the baffles a positive action. Before entering into a detail description of the practical operation of the organized mechanism of this invention I would state that if by any chance the weight of an egg for instance were not sufficient to depress one of the scale platforms that are arranged in a graded weight series it would allow another egg to be fed into the basket while said basket was occupied. In order to obviate this I provide a trip 80 Figures 4 and 12 immediately to one side of the stationary platform of the device and if the basket has any weight whatsoever after having traveled one complete cycle of the machine it will strike this trip 80. This will cause the arm 81 that is journalled in the support 82 to turn because of the fact that the trip 80 is fast on the arm and will move around in front of the basket on its second cycle of the machine. On the upper end the arm 81 is provided with a member 83 having a trigger 84 that normally engages the kerf 85 of a link 86 that in turn is journalled in a lever 87. This lever is pivoted at 88 and secured to move with lever 87 is a curved lever 89 that is limited in its movement toward support 90 by means of stop 91. Secured to the support 90 is a spring 92 and arranged above the curved lever 89 and adapted to bear thereon is an end of link 93 having a kerf 94. The link 93 on its opposite end is pivoted to a stud 95, attached to lever 63. When the basket strikes the trip 80 it turns the arm 81 which imparts a similar movement to the trigger 84 of the member 83. This releases the link 86 from the trigger 84 and the pressure exerted by the spring 92 on the release of the lever 87 moves the curved lever 89 upwardly. This action in turn imparts a similar movement to the link 93 and lifts same off a pin 96 secured on the bell crank 67. This movement of the link 93 out of engagement with the pin of the bell crank throws the bell crank out of contact with the feed actuating mechanism of the device and consequently the feed of eggs into the machine is effectually precluded.

In the practical operation of the invention, eggs are placed in the trough of the machine, and the motor operating the shaft 7 will cause the cam plate and carrier to rotate, and such rotation of the plate will manifestly cause the cams on the lower surface of the said plate to actuate the rollers of the feed operating levers. The movement as before described is one that raises first the initial baffle plate encountered by an egg and then the second baffle plate. As set forth the second baffle is moving downwardly while the first baffle is moving upwardly, and vice versa. The egg is fed onto the stationary platform, and rolls into the basket directly in line with the stationary platform. The scales of the various weighing platforms are set before operation of the machine is started, in such a manner that eggs of a heavy or the heaviest weight will actuate the first platform in the series, and the second scale is set with a weight pressure slightly less than the first and so on with the entire series of platforms. The egg dropping into the basket and this at a time while the basket is slowly revolving and in proper timing, is then moved from the stationary platform to the first scale platform. Manifestly the basket is pivotally hinged to the frame of the equalizing device that has the wheel 25 that bears on first the stationary platform and then the platform of the series of scales in its travel around the driving shaft. If the weight of the egg is sufficient to throw the equalizer off balance to a sufficient degree to overcome the pressure set by the scale, the wheel will depress the platform of the scale, and hence the trigger of the cam on the upper side of the plate 9, will strike the trip of the basket and tilt the basket forwardly so as to roll the egg from the basket to the bin or section of the egg sorting pan that is in direct line with the scale resting adjacent thereto. If the weight of the egg is not sufficient to exert enough pressure to force the wheel 25 of the equalizer far enough downwardly to depress the platform of the first scale, then the basket and its elements including the equalizer passes to the next scale platform, and so on until the elements encounter a scale platform that the weight of the egg will operate through the equalizing device.

If when the basket has passed the last platform, and for various reasons, the egg is still in the basket, the said basket being slightly depressed will strike the trip 80 and push it forward ahead of the basket thus turning the arm 81 which in turn swings the trigger 84 thereby releasing the link 86 and the pressure exerted by the spring 92 moves the curved arm 89 upwardly against the link 93 off the pin 96. This will release the bell crank 67. The link of the bell crank being out of contact with the cam actuating mechanism 10 and 11 of the feeding mechanism will cause no lifting of the baffle and hence no feeding of the eggs.

I would distinctly have it understood that the trough, the baskets and the sections of the egg receiving plate are covered with a suitable soft material to prevent breakage of the eggs during the assorting operation.

What I claim:—

1. In means for weighing and sorting eggs, the combination of a base, delivery bins arranged above the base, a series of weighing baskets arranged adjacent the bins and means for feeding the eggs to the weighing baskets and comprising cams arranged on the base, a shaft arranged in the base, and means actuable by rotation of the shaft to actuate the cams, levers actuable by the cams, and means for controlling actuation of the levers, a trough arranged adjacent the bins and levers, baffles arranged in the trough and means secured to the levers and baffles for feeding the eggs through the trough in a step by step operation.

2. Feed mechanism for egg sorting machines comprising a shaft, a hub secured to the shaft, cams revoluble with the hub, rollers actuable by the cam, levers secured to the rollers, bell cranks actuable by the levers, levers adapted to secure the arms to the bell cranks, baffle plates movable by the arms and a trough arranged below the baffles.

3. In an egg weighing and sorting machine, the combination of a base, a casing mounted on the base, a series of bins secured to the casing, a step by step feeding mechanism arranged adjacent the casing, a stationary platform adjacent the feed end of the feeding mechanism, a series of balanced weighing elements arranged adjacent the stationary platform and adapted to move with respect thereto and a series of baskets actuable by the weighing mechanism and adapted to pass the egg to one of the bins and means adapted to prevent operation of the feeding mechanism when an egg does not move from one of the baskets.

4. In a device for feeding eggs to a weighing and sorting machine, the combination of a feed trough, baffles disposed in the feed trough, angle members secured to the baffles and means for lifting the baffles alternately to bring about a step by step movement of the contents of the trough and comprising levers secured to the angle members, a hanger secured to the levers, a bell crank pivoted to the hanger, a link secured to the bell crank, a roller adapted to engage the link and cams adapted to actuate the roller inwardly and outwardly; and a rotatable member adapted to actuate the cams substantially as and for the purpose specified.

5. A weighing and sorting machine for eggs comprising a support, a shaft rotatable therein, a plurality of weighing platforms mounted to rotate with the shaft, cams rotatable with the platforms but movable relatively thereto, operating means for the cams mounted on the support at points spaced about the shaft, said operating means serving to actuate said cams relative to the platforms and cooperative means between said cams and platforms whereby said platforms are tripped by said cams to discharge an egg at various stations corresponding to the weight of the egg.

In testimony whereof I have hereunto set my hand.

CLEMENT SMITH.